Oct. 18, 1966  W. J. BRAUN  3,279,274
VARIABLE SPEED TRANSMISSION
Filed April 6, 1964  4 Sheets-Sheet 1

INVENTOR.
WILLIAM J. BRAUN
BY
Schapp & Hatch
ATTORNEYS

Oct. 18, 1966  W. J. BRAUN  3,279,274
VARIABLE SPEED TRANSMISSION
Filed April 6, 1964  4 Sheets-Sheet 2

FIG. 3.

INVENTOR.
WILLIAM J. BRAUN
BY
Schapp & Hatch
ATTORNEYS

Oct. 18, 1966 W. J. BRAUN 3,279,274
VARIABLE SPEED TRANSMISSION
Filed April 6, 1964 4 Sheets-Sheet 3

FIG. 4.

INVENTOR.
WILLIAM J. BRAUN
BY Schapp & Hatch
ATTORNEYS

Oct. 18, 1966  W. J. BRAUN  3,279,274
VARIABLE SPEED TRANSMISSION
Filed April 6, 1964  4 Sheets-Sheet 4

INVENTOR.
WILLIAM J. BRAUN
BY Schapp & Hatch
ATTORNEYS

United States Patent Office 3,279,274
Patented Oct. 18, 1966

3,279,274
VARIABLE SPEED TRANSMISSION
William J. Braun, 5290 Minerva Ave.,
Sacramento 19, Calif.
Filed Apr. 6, 1964, Ser. No. 357,638
19 Claims. (Cl. 74—351)

The present invention relates to improvements in a variable speed transmission, and particularly to a variable speed transmission incorporating a novel gear system.

Speed and power transmissions are well-known, and the most satisfactory transmissions for transferring power from one shaft to another utilizes gears or gear systems so that a positive drive may be assured without slippage and the torque forces are positively transferred from one shaft to another. However, in gear systems of this type, it has been necessary to provide a rather large number of gears and present considerable mechanism in order to obtain a large number of gear or power ratios.

Another problem which has been considered in the transmission art is that of providing a series of speed ratios which advance or retard in step-wise direction so that a selection of gear ratios over a rather smooth power transmission curve may be obtained. In this connection, it is important to utilize such a system for providing changes in speeds from a constant speed motive power source such as a diesel engine or an electric motor.

It is also desirable to provide the above mentioned advantages in a unit which operates efficiently, i.e. without excessive loss of power and resulting heating and wearing problems. It is also desirable to provide such a transmission which may be automatically controlled and does not require the use of a clutch mechanism between shifting operations.

In this connection, it is also desirable to have a device which has a large number of ratios and a rather small change between ratios. The extent of this change is a measure of smoothness of transmission from one ratio to the next, and hence an indicator of the operating characteristics of the device.

It is therefore, a primary object of the present invention to provide a variable speed transmission of the character described containing multiple gear units having the ability to provide a multiple number of ratios between the drive unit and the driven unit in an efficient manner.

Another object of the invention is to provide a power transmission of the character described in which the gear units contain cylindrical pins which are especially mounted so that the pins on a drive gear engage with the pins on a driven gear and provide an efficient transmission of power thereto, with the groups of pins being arranged concentrically on the gear units so that multiple pin drives may be effected with the same gear pair in accordance with the ratio desired.

A further object of the invention is to provide a variable speed transmission which is capable of providing many uniform changes of ratio over a rather large range in a comparatively small compact unit.

A still further object of the invention is to provide a variable speed and power transmission which contains multiple reverse ratios as well as multiple forward ratios.

Still another object of the invention is to provide a variable speed power transmission where a large number of changes in gear ratios are effected in such a manner that only one or at the most a few gear engagements are in operation for each ratio so as to prevent power loss in transmission through a large gear train, and eliminate slack problems between driving gears such as is encountered in gear trains.

Yet another object of the invention is to provide a variable speed transmission of the character described which will move smoothly from one gear ratio to another without the need for a clutch and which may be easily converted into an automatic power transmission.

Further objects and advantages of the invention will be apparent as the specification progresses, and the new and useful features of the variable speed transmission will be fully defined in the claims attached hereto.

The preferred forms of the invention are illustrated in the accompanying drawings, forming a part of this description, in which:

FIGURE 5, a sectional elevational view taken in the line 5—5 of FIGURE 2 and illustrating in greater detail the mechanical construction of a forward speed and reverse speed mechanism that may be incorporated in the present invention;

While only the preferred forms of the invention are shown, it should be understood that various changes or modifications may be made within the scope of the claims attached hereto without departing from the spirit of the invention.

In its broad aspects, the invention provides improved gear means for transferring power from a drive shaft to a driven shaft which are rotatably mounted in a suitable housing. These gear means include one or more pairs of disc shaped gears carried on said shafts in face-to-face spaced relation with each gear disc containing a plurality of engagement assemblies and means for selectively moving the engagement assemblies on the opposed gears into driving position to complete driving engagement between the drive shaft and driven shaft. The use of opposed gears carrying a plurality of engagement means on each gear has the obvious advantages of providing a plurality of different gear ratios on the same gear pair with the resulting saving in space and a uniform high efficiency.

However, certain mechanical problems have had to be overcome in order to provide such a structure.

In particular, the gear discs must be strong enough to carry these engagement members so that the inner members may be axially movable with respect to the discs and yet all of the members including the outer members should be contained on a disc strong enough to carry the torque forces required in the unit. In order to accomplish this end, the device utilizes a pair of foraminous discs having holes formed in a series of concentric circles, and pins as the engagement portion of the engagement assemblies with the pins being carried in said holes. With such an arrangement, it is possible to provide a large number of different driving positions in a single pair of geared discs.

The particular pin structure utilized has been specially constructed in order to reduce frictional losses to a minimum and to provide special meshing action as will be more fully described hereinafter. Means for axially moving the engagement assemblies containing the pins are also specially constructed and synchronized so that the proper meshing of gears is positively assured at all times.

An important feature of the present invention is to provide a variable speed transmission containing the above mentioned structure which is capable of providing equal increments of speed changes or steps as it advances from a given gear ratio to the next higher or lower. In other words, the gear ratios should be programmed so that the gear may effect changes which vary in a linear fashion. If a series of equally spaced concentric engagement assemblies are provided on a pair of disc-like gears in intermeshing relation, that is, in relation so that the smallest radius of the circle on one disc is tangent to the largest radius circle on the other disc with matching circles in between, the curves will vary in accordance with a non-linear function. This variance will be somewhat similar to those produced by variable pitch pulleys such as that shown in U.S. Patent 3,009,363 and the two frusto-conical members in U.S. Patent 2,369,378 and other similarly reacting dual systems.

In addition to the problem of providing a linear curve without waste space, there are very definite physical limitations in connection with the number of concentric engagement assemblies that may be provided on the disc which are physically strong enough to carry the required forces. Accordingly, it is an important feature of this invention to provide means whereby a large number of different ratios may be provided with linear changes between gear ratios.

In the drawing, there is shown a system in which nineteen different gear ratios are provided in a single transmission system, the ratios varying linearly on or a linear scale. Thus in FIGURE 1 there is shown a series of radii worked out with the proper dimension ratios to provide a series of drives varying linearly from two through twenty or multiples thereof. For the sake of convenience, we will consider that the drive shaft is moving at the rate of 100 r.p.m. and the driven shaft then will be moving at a speed selected in the range from 20 to 200 r.p.m. at any multiple of 10 within this range. Of course, it will be appreciated that other gear means may be added to provide additional drives such as a speed of 10 or even one r.p.m., if desired. In addition, it is possible to obtain a low ratio of 11.1 or specifically 1/9 of the driving speed in combination with this scale of 20 through 200 in the mechanism illustrated. These radii are labeled in FIGURE 1 as $a1$, $a2$, etc. for the radii on the drive shaft and $b1$, $b2$, etc. for the radii on the driven shaft. Table I below is the values for these different radii together with the ratio achieved.

TABLE I

Figures 1, 2:
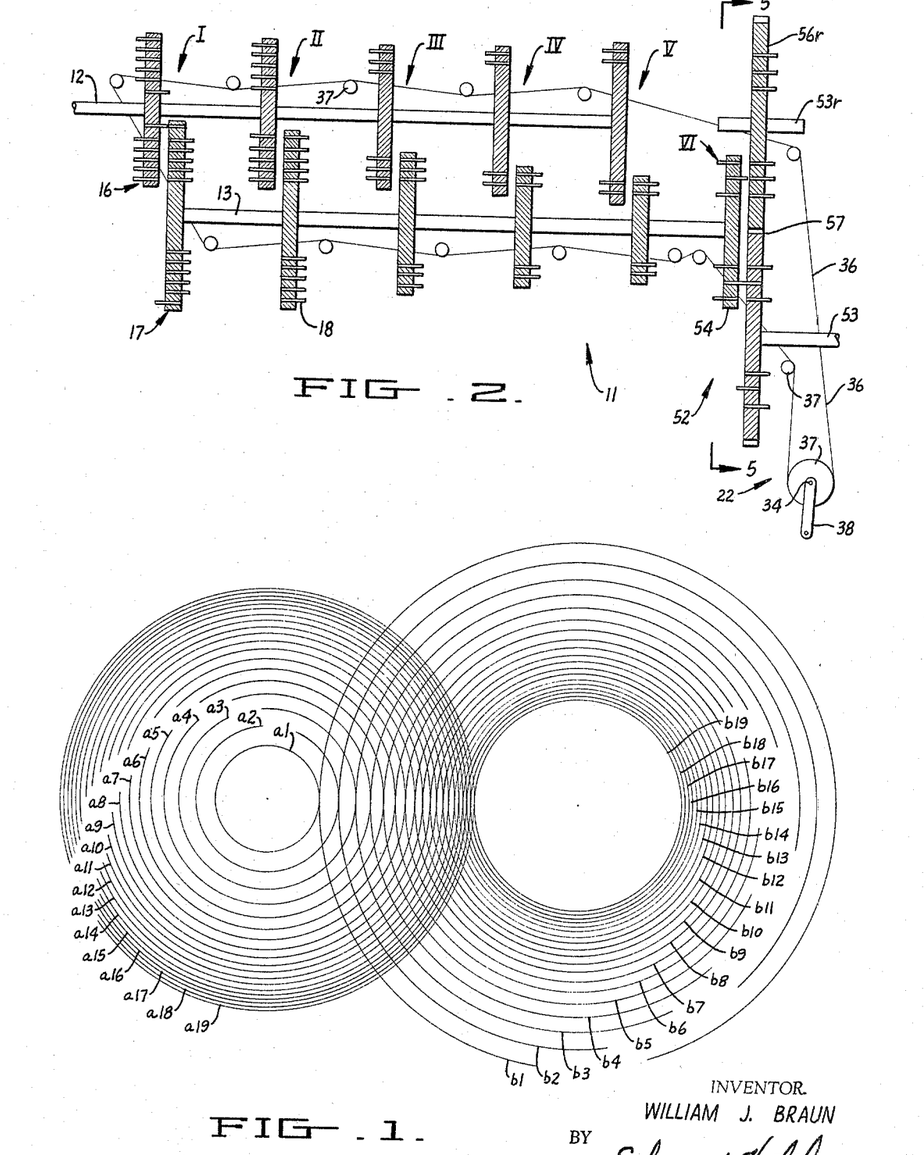
FIGURE 1 is a diagrammatic view illustrating the spacing of various operative radii of a pair of gear elements which is required to achieve a uniform step-wise change of ratio desired by a transmission constructed according to the invention.
FIGURE 2, a diagrammatic plan view illustrating a typical transmission constructed according to the invention in which the ratios illustrated in FIGURE 1 are spaced among six different pairs of gear members carried on a drive shaft and driven shaft so as to achieve the overall step-wise effect diagrammed in FIGURE 1.

[Program for linear variation of speed from constant speed source]

| Drive Radius | Driven Radius | Ratio | Driven Shaft Speed for Drive Shaft Speed of 100 R.P.M. |
| --- | --- | --- | --- |
| $a1$—1 | $b1$—5 | 1:5 | 20 |
| $a2$—1.385 | $b2$—4.615 | 3:10 | 30 |
| $a3$—1.7143 | $b3$—4.2857 | 2:5 | 40 |
| $a4$—2 | $b4$—4 | 1:2 | 50 |
| $a5$—2.25 | $b5$—3.75 | 3:5 | 60 |
| $a6$—2.471 | $b6$—3.529 | 7:10 | 70 |
| $a7$—2.667 | $b7$—3.333 | 4:5 | 80 |
| $a8$—2.842 | $b8$—3.158 | 9:10 | 90 |
| $a9$—3 | $b9$—3 | 1:1 | 100 |
| $a10$—3.1429 | $b10$—2.8571 | 11:10 | 110 |
| $a11$—3.2728 | $b11$—2.7272 | 6:5 | 120 |
| $a12$—3.3913 | $b12$—2.6087 | 13:10 | 130 |
| $a13$—3.5 | $b13$—2.5 | 7:5 | 140 |
| $a14$—3.6 | $b14$—2.4 | 3:2 | 150 |
| $a15$—3.6924 | $b15$—2.3076 | 8:5 | 160 |
| $a16$—3.7778 | $b16$—2.2222 | 17:10 | 170 |
| $a17$—3.8572 | $b17$—2.1428 | 9:5 | 180 |
| $a18$—3.9311 | $b18$—2.0689 | 19:10 | 190 |
| $a19$—4 | $b19$—2 | 2:1 | 200 |

As indicated above, it is not physically possible to provide all of these ratios in practical distributions on two pairs of gears constructed according to the invention. Accordingly, these radii are conveniently divided among a plurality of pairs of gears so that all ratios are provided between a single drive shaft and a single driven shaft. In the mechanism shown in FIGURE 2, one of the changes is effected by utilizing the ratios on the reversing mechanism constructed according to the invention which provides for reverse speeds over the same scale as the forward speeds. Thus, Table II below illustrates the distribution of the various radii on the various sets of gears which provide the desired programming.

Although the specific values are here given for the sake of illustration, it will be appreciated that other values could be worked out. However, it is important to realize in designing such values that the actual ratio achieved is determined by the ratio of the number of pins on the drive gear with respect to the number of pins on the driven gear. Moreover, in order to provide tight fitting pins so as to substantially eliminate slack and avoid undue driving friction, these ratios should be accurately worked out with the size of the pins being taken into consideration. Of course, the pins need not be the same size for different ring assemblies of pins so long as they are uniform in each assembly. However, it will generally be desirable to use the same size pin assemblies for interchangeability of parts and substantial uniformity of strength.

Figure 3:
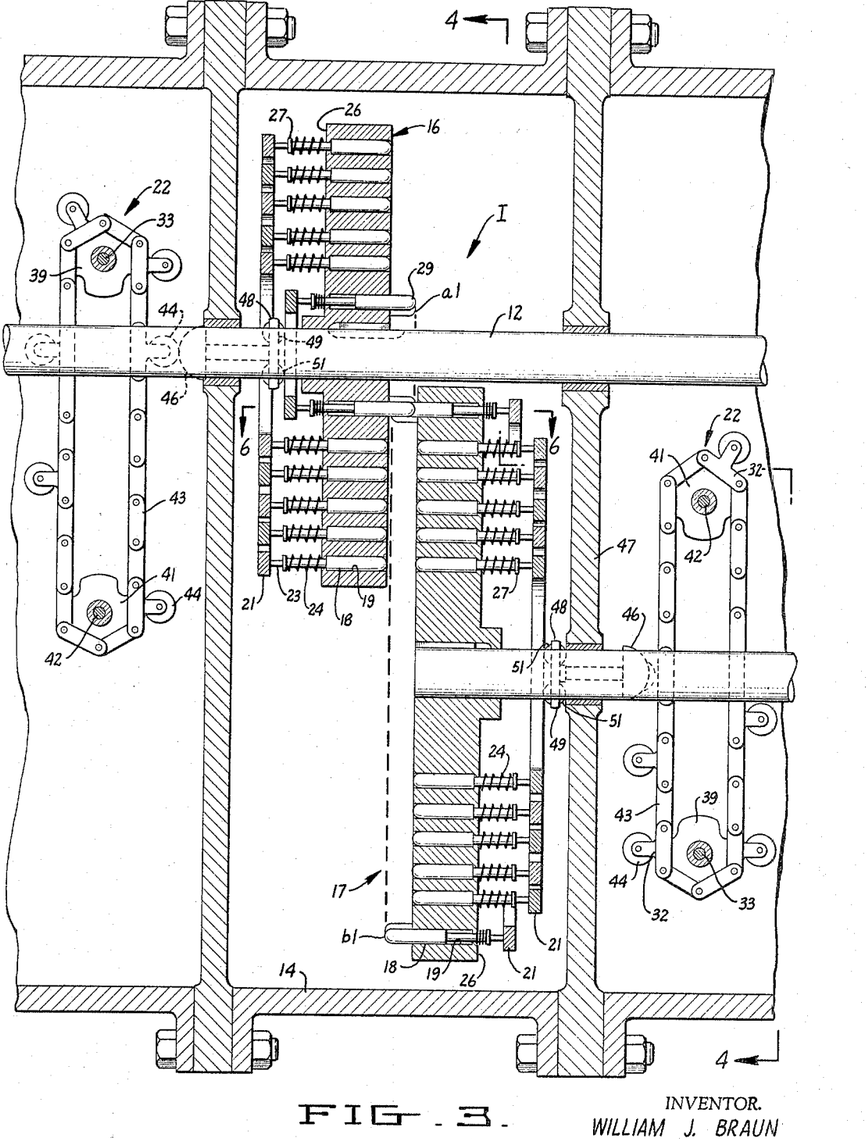
FIGURE 3, a fragmentary sectional view illustrating the transmission of FIGURE 2 showing certain of the parts in greater detail including the novel pin driving mechanism of the present invention.
Figure 4:
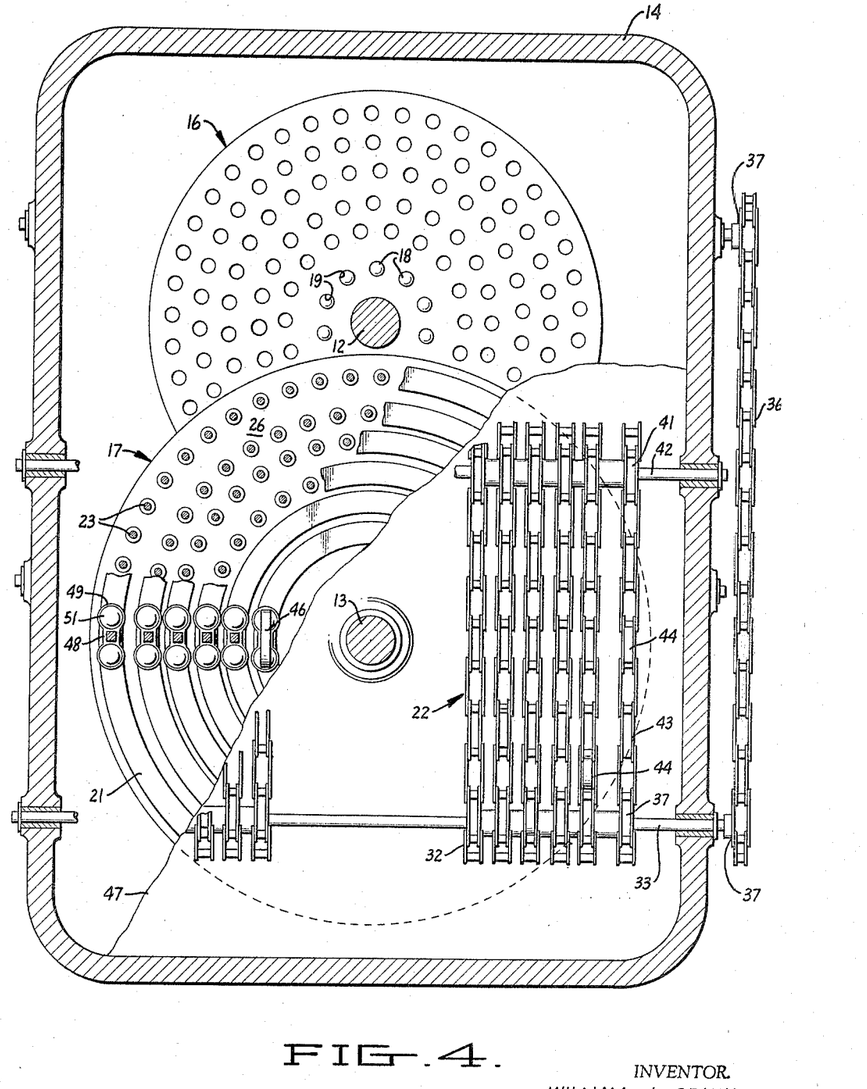
FIGURE 4, a sectional view of the transmission system shown in FIGURE 3 taken in sectional relationship therethrough as illustrated in the line 4—4 of FIGURE 3.

Referring again to the drawings in greater detail, there is shown in FIGURE 2, a variable speed transmission 11 comprising a drive shaft 12 and a driven shaft 13 both rotatably mounted in spaced parallel relation in a suitable housing 14, see FIGURES 3 and 4. The drive shaft, driven shaft and housing are of conventional structure with the housing adapted to contain suitable lubricating oil or transmission grease. However, the gear means contained in this unit for transferring rotational power from the drive shaft to the driven shaft generally comprises a plurality of pairs of gears indicated by Roman numerals I through VI which have the programmed ratios described above and shown in Table II.

TABLE II

[Distribution of matched gear drives]

| Pair I | Pair II | Pair III | Pair IV | Pair V | Pair VI |
| --- | --- | --- | --- | --- | --- |
| $a1$ : $b1$ | $a2$ : $b2$ | $a6$ : $b6$ | $a10$:$b10$ | $a13$:$b13$ | $a17$:$b17$ |
| $a3$ : $b3$ | $a4$ : $b4$ | $a9$ : $b9$ | $a15$:$b15$ | $a19$:$b19$ | |
| $a5$ : $b5$ | $a7$ : $b7$ | $a14$:$b14$ | | | |
| $a8$ : $b8$ | $a11$:$b11$ | | | | |
| $a12$:$b12$ | $a16$:$b16$ | | | | |
| $a18$:$b18$ | | | | | |

These pairs are generally similar except for the placement of engagement assemblies carried thereon so that the detailed description given for the gear pair I will be understood to apply with equal force to the other gear pairs and will not be repeated herein.

As here shown, the gear pair I generally comprises a disc shaped drive gear 16 mounted on and rotatable with the drive shaft 12 and a disc shaped driven gear 17 mounted on and rotatable with the driven shaft 13. The drive gear and the driven gear are disposed in substantially parallel planes in face to face overlapping arrangement and each gear has engageable assembly on the face thereof in position to mesh with the assembly of the opposed gear.

These assemblies are generally similar and each comprise a plurality of pins 18 mounted for rotational and axial movement through holes 19 in the associated disc shaped gear, a ring 21 adapted to move the pins axially through the disc, and means 22 for urging the rings axially in accordance with a controlled program.

Figure 6:
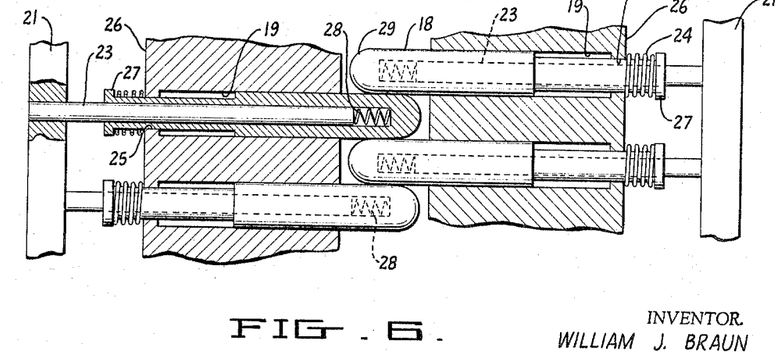
FIGURE 6, an enlarged fragmentary sectional view illustrating more clearly the novel drive pins of the invention substantially as seen in the plane of line 6—6 of FIGURE 3, and FIGURE 7, a diagrammatic view illustrating a gear train that may be constructed according to the invention.

As best seen in FIGURE 6, the pins 18 are preferably hollow and are adapted to receive plunger-like ring connectors 23 which are operatively connected to rings 21. The ring connectors are preferably connected to the rings 21 by swaging or any other standard means in order to provide an integral unit. With this construction, the pins hold the rings 21 in the proper position. As best seen in FIGURES 3 and 6, the pins are normally held within the holes 19 of their associated disc member and out of engagement with the pins of the opposed disc. These pins are held in retracted position by compression springs 24 which are fit between the rear face 26 of the disc and the flange collar 27 on the pin 18. In this way these springs tend to urge the pins into retracted position and push the rings 21 into the position required for such retraction. If desired, the holes 19 can have a smaller bore 25 at one end as illustrated in FIGURE 6 to retain the pins. However, such retaining structure is optional and may be omitted.

When it is desired to place the pins in engagement position, the rings 21 are urged forward by cam means or similar devices so as to compress the springs 24 as shown in FIGURE 6. In some cases, the opposed pins will tend to meet head-on during the engagement thereof, and release means are provided to prevent damage in such a case. These release means include compression springs 28 which cooperate with the plunger construction of the pins 18. Accordingly in order for the ring connectors 23 to push pins 18, they must act through the compression springs 28 which are held between the end of the plunger 23 and the base of the hollow portion of the pins 18. These compressions springs 28 are stronger than the compressions springs 24 so that they normally retain the pin and plunger in proper spaced position but are free to yield when extraordinary forces are applied.

In addition, it should be noted that the engaging ends of pins 18 are constructed in hemispherical fashion, see surface 29 of FIGURE 6. With this construction the pins will slide easily past one another to obtain a smooth engagement. It will be appreciated that all of the pins in each circle except those at the meshing position will be positioned immediately.

It should also be noted, that the pins are mounted in the disc members so as to be free to rotate, and this rotational ability is important as the pins swing tangentially into engagement with the pins of the opposed disc so that no lateral or scraping forces need be overcome at the mesh contact during driving action. In other words, the pins are free to act in a manner similar to roller bearings during driving action so as to provide rolling friction rather than scraping friction at these points of contact.

In order to provide the desired speed changes in accordance with this invention, it is important to provide means for moving the desired engagement assemblies into meshing position in synchronized fashion. When none of the engagement assemblies are advanced so as to cause the pins to project from the front of the face of the discs, the transmission is in a neutral position and no power will be transmitted between the drive shaft and the driven shaft. This position, of course, has its advantages, and in the embodiment here shown is provided between the forward drive positions and the reverse drive positions. In addition, it is important that only the engagement assemblies which should be engaged are pushed into operative position in order to prevent inconsistent drive forces that could cause breakage to the pin structure.

Accordingly, the means for moving the engagement assemblies axially on the drive gear and the driven gear are timed so that the previously used system is retracted before the new system is engaged. In addition, it is an important feature of this invention to provide a timed or programmed means so that speeds move smoothly in step-wise fashion from one speed to another without undergoing large jumps or increments of speed change. This form of the invention is important in providing advantages such as that of eliminating the need for a clutch mechanism in certain cases, and providing automatic control which operates from the engine speed to maintain the efficiency of the engine at its maximum or from other criteria.

In general, the means for operating the engagement assemblies may be any suitable system capable of performing the above function. Thus it is contemplated that a suitable electric system could be developed, if desired. However, a suitable mechanical system has been designed which utilizes a cam system for providing the desired timed movement, and this cam system is considered to be eminently satisfactory. Although a specific cam system is here shown, it will be appreciated that certain of the parts such as the chain drive structures could be modified, if desired. However, it is important that all of the cams be operable from a single control shaft, and that they be positively retained in synchronized fashion so that the engagement assemblies are positively certain to be moved properly as explained above.

Referring again to the drawings, there is shown a means 22 for moving the appropriate engagement assemblies which comprises a series of cam units 32 mounted to receive rotational movement from cam shafts 33, a master control shaft 34, and means for imparting rotation from the master control shaft 34 to the cam shafts 33 in the form of a chain 36 adapted to engage sprockets 37 on the master control shaft 34 and various cam shafts 33. In this way, the rotational position of the master control shaft 34 positively provides positioning of the various cam shafts 33 and their associated cam units 32. Although a chain 36 is shown herein for the sake of illustration, it will be appreciated that gear drives could be utilized instead of the chain and sprockets or any other equivalent means for positively locating the rotational position of the cam shafts by controlling the rotational position of the master control shaft. This master control shaft may be positioned by manual operation of crank handle 38 or by any other operational means including automatic control devices.

As here shown, there is a cam shaft 33 provided for each of the gears 16 and 17 and a pair of cam units 32 for each engagement assembly in position to operate against the ring 21 thereof. Thus, in the gear pair of group I, which is more fully shown in FIGURES 3 and 4, there are six engagement assemblies for each gear and therefore twelve cam units 32 carried on each of the cam shafts 33. In the position shown, a gear ratio of 1 to 5 is provided so that the drive shaft will be driving at a speed five times the speed of the driven shaft. This engagement is achieved by virtue of the fact that the cam units 32 for ring assemblies 21 at radius $a1$ and $b1$ are in engagement position while the other cams are retracted.

Referring more particularly to the cam structure and to FIGURE 3 in particular, it is seen that each of the cam units 32 comprises a sprocket 39 carried on the cam shaft 33, a sprocket 41 carried on an idler shaft 42, a chain 43 carried on said sprockets and having a cam 44 in the form of a wheel mounted thereon. As best seen in FIGURE 3, each of the cams is mounted in different positions and these cams represent a very small fraction of or about ½₀ of the set positions for the cams. In this way, about twenty different positions may be set by the master control handle with not more than one of the appropriate cams being in engagement position.

Referring again to FIGURE 3, it is shown that the cam surface of cam 44 actuates a tappet 46 which is mounted in a suitable frame structure 47 in the housing 14. This frame structure also serves to provide journaled bearings for the shafts holding various gears. Each tappet 46 actuates a ring follower 48 to force it up against one side of the appropriate ring 21. With the cams and ring followers operating to push each side of the ring 21, it is seen that the entire ring is pushed axially so as to push the plunger-like ring connectors inward and force the circle of pins 18 outward into engagement position. In this connection, it is seen that the plunger-like ring connectors also serve to guide the ring in this movement so that with axial pressure on only two sides of the ring, movement is positively effected.

It will be appreciated that the rings 21 will rotate along with their associated gear while the ring follower 48 will not rotate. Accordingly, it is desirable to provide a low friction bearing surface between the ring follower and the ring and this is here accomplished by a bearing race 49 carrying two ball bearings 51.

Figures 5, 7:
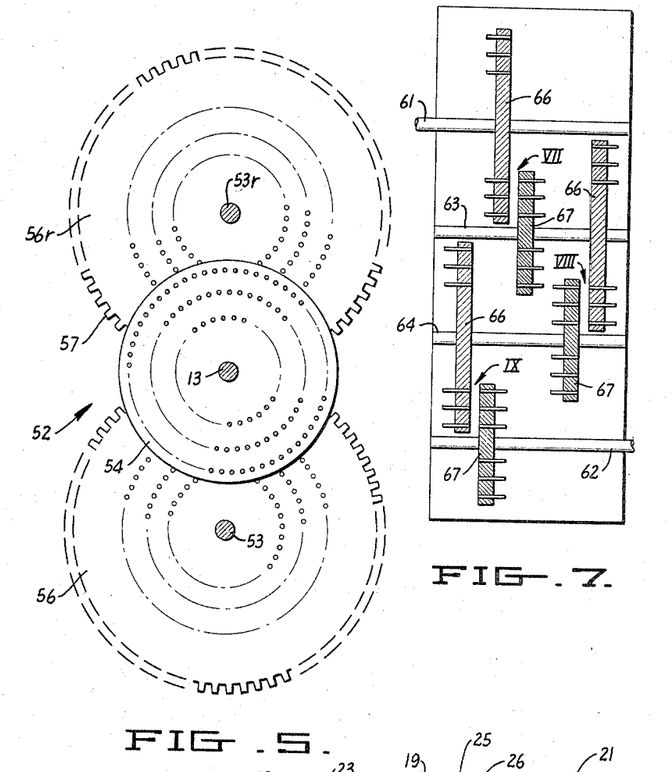

So far, the description has shown how power is transmitted between drive shaft 12 and driven shaft 13, with one of the driving ratios as shown in gear pair VI being incorporated into the reversing srtucture in the embodiment of FIGURES 1 through 6 of this invention. Referring more particularly to FIGURES 2 and 5, there is shown a reversing assembly 52 in which the driven shaft 13 serves as a drive shaft driving through gear pair VI to final output shaft 53. Thus gear pair VI comprises drive gear 54 mounted on driven shaft 13, driven gear 56 carried on output shaft 53, and driven reversing gear 56r carried on idler shaft 53r. Gears 56 and 56r are constructed to contain teeth on their outer peripheries and function as spur gears as well as to contain the engageable assemblies on the faces thereof. Thus gears 54, 56 and 56r contain engagement assemblies at radius $a20$ and $b20$ which are matched to transfer even speeds and will be engaged in the ordinary situation. In addition, these gears have the radii $a17$ and $b17$ to provide the ratio of 1.8:1 to be formed by group VI of the gears and is obtained by utilizing this radius in combination with the direct drive ratio between shafts 12 and 13 as obtained by matched drive radii $a9$ and $b9$ as shown in Table I. When it is desired to provide reverse direction on output shaft 53, the engageable assemblies on gear 56 are retracted so that drive gear 54 does not directly drive gear 56 but instead drives gear 56r which in turn has its engageable assemblies placed in proper position. The gear 56r drives gear 56 through the teeth 57 on the periphery of the gears in conventional fashion to provide reverse rotation.

It will be appreciated that other types of reversing assemblies could be provided if desired, and that in some cases the additional frictional loss resulting from this reversing assembly should be omitted from the direct drive assembly. In such a case, the structure could be modified so that all direct drives could be produced directly from driven shaft 13. It will also be appreciated, that the cams which operate the engageable assemblies carried by gears 54, 56 and 56r will also be modified so that in the forward direction, $a20$ and $b20$ of gears 54 and 56 will remain in engagement except in the one instance where the 1.8:1 ratio of the gears at radii $a17$ and $b17$ are desired. Similarly, during the reversing actions, the cams of the gear 56 will all be out of position so that the rings will be retracted but the engageable assemblies of gear 56r will have their pins at radius $b20r$ engaged in all positions except the one in which $b17r$ is in engagement.

From the foregoing description, it is seen that I have provided a variable speed transmission which will provide step-wise speed changes between an input shaft and an output shaft so that various output speeds may be obtained with a substantially constant speed input or, stated in another way, considerable ranges of output speeds may be obtained with a given speed or range of input speeds. The advantages of such a transmission are many. For example, the transmission is particularly valuable with constant speed motors such as diesel engines and synchronous electric motors where various output speeds are desired. In addition, it is useful with variable speed motors such as internal combustion engines because the engine speed can be maintained at its most efficient output and such speed utilized by varying the transmission setting to match the output speed desired. In addition, the smooth order of transition between ratios allows gear shifting to take place, in some cases, without the use of a clutch.

In such a case, the transmission is particularly suitable for automatic operation where control means may be added to adjust the position of handle 38 or master control shaft 34 according to speed changes of the engine as measured by tachometer or like device. Thus, a diesel could be completely automated and shift automatically to compensate for changes in the shaft speed so as to maintain the engine at a substantially constant speed as desired.

While I have shown a rather large number of speed changes for the sake of illustration, it will be appreciated that an even smaller number could be provided, if desired. It will also be appreciated, that this transmission could be used in combination with a clutch if desired, and this might be desirable where only a rather small number of speed changes are wanted. However, it will be appreciated that many possible speed changes may be obtained without any change in overall efficiency and with a compact unit. Accordingly, it is believed that internal combustion engines utilizing the transmission of this invention would probably utilize more output speeds than is conventional with such engines and that the resulting increase in number of output speeds will provide an increased efficiency for the engine. This in turn allows for the use of a smaller engine.

It is also believed that in some cases, rather large speed changes may be desirable, and the embodiment shown in FIGURE 7 illustrates diagrammatically how the present invention may provide many speed changes over a rather large range in a small compact structure. This is accomplished by providing a gear train where the gear pairs are stacked in series with intermediate output shafts serving as input shafts much the same as shaft 13 in FIGURE 2 does for the extreme low ratio obtainable in that device.

Thus, in FIGURE 7, there is shown an input shaft 61 drivingly connected to an output shaft 62 through intermediate shaft 63 and 64. The driving is accomplished through three sets of gear pairs grouped as gear pair VII which contains drive gear 66 and driven gear 67, and gear pairs VIII and IX and also contain drive gear 66 and driven gear 67 of similar construction to those of gear pair VII.

As here shown, the drive gears 66 will contain engagement assemblies similar to those shown in the embodiment of FIGURES 1 through 6 with pins spaced on concentric circles of radii of 3, 4 and 5 units while gear 67 contains engagement assemblies at radii of 3, 2 and 1 units. Thus each gear pair provides a ratio possibility of 1:1, 2:1 and 5:1. The gears are engaged by means of a cam system similar to those of the embodiment disclosed in FIGURES 1 through 5 with the proviso that one of the three sets of engagement assemblies for each pair will be engaged at all times except during a neutral position that might be provided.

The output speeds which are possible from a given input speed from this arrangement range from a direct drive output ratio of 1:1 to a ratio of 1:125, which represents a substantial gear reduction. Such a gear reduction would be possible with an ordinary gear train, but the gear train of the present invention also provides the following intermediate ratios without loss of efficiency; 1:2, 1:4, 1:5, 1:8, 1:10, 1:20, 1:25, and 1:50. While this range of ratios does not vary in linearity fashion as those in the other embodiment, it will be appreciated that a large number of ratios over a considerable range are obtained in an efficient and compact unit. Accordingly, the present invention also includes gear trains containing the gears of the invention in series.

It will be appreciated that further variations may be made to include more ratios by utilizing four or more operative ratios on each gear or by increasing the length of the gear train. However, it will be appreciated that increasing the length of the gear train results in reduced efficiency and an increased amount of slack in the system. Accordingly, excessive lengths are preferably avoided.

From the foregoing description, it is seen that I have provided an improved variable speed transmission which is simple in design and capable of providing improved performance in many different situations. It is also seen that my variable speed transmission is capable of providing improved performance with an efficient compact unit which is simple to construct and reliable in operation.

I claim:

1. In a variable speed transmission comprising a housing, a drive shaft and a driven shaft rotatably mounted in the housing in spaced parallel relationship, in combination, gear means for transferring rotational power from the drive shaft to the driven shaft comprising a disc shaped drive gear mounted on and rotatable with said drive shaft, a disc shaped driven gear mounted on and rotatable with said driven shaft, a plurality of engagement assemblies carried on the face of said drive gear, a plurality of engagement assemblies carried on the face of said driven gear, said drive gear and said driven gear being disposed in substantially parallel planes in face to face overlapping arrangement whereby an engagement assembly of the drive gear may be engaged with an engagement assembly of the driven gear, and means for axially moving the engagement assemblies on said drive gear and corresponding engagement assemblies on said driven gear whereby said assemblies mesh to complete driving engagement between the drive shaft and the driven shaft.

2. In a variable speed transmission comprising a housing, a drive shaft and a driven shaft rotatably mounted in the housing in spaced parallel relationship, in combination, gear means for transferring rotational power from the drive shaft to the driven shaft comprising a drive gear mounted on and rotatable with the drive shaft including a foraminous disc having holes formed on the circumferences of a series of concentric circles disposed in central alignment with the axis of said drive shaft, a driven gear mounted on and rotatable with the driven shaft including a foraminous disc having holes formed on the circumferences of a series of concentric circles disposed in central alignment with the axis of said driven shaft, said drive gear and said driven gear being disposed in substantially parallel planes in face to face overlapping arrangement and having the concentric circles defined by the holes of one gear being laterally spaced from an external tangential position to the concentric circle of the other gear, a plurality of engagement assemblies carried on the drive gear and the driven gear in the concentric circles thereof, each of said engagement assemblies containing a group of cylindrical pins adapted to fit into the holes disposed in a circle and a ring carried on said group of pins in position to move the pins axially through the disc, and means for moving said rings axially with respect to the gears in synchronized fashion for synchronized engagement of selected engagement assemblies whereby said assemblies mesh to complete driving engagement between the drive shaft and the driven shaft.

3. The variable speed transmission defined in claim 2, in which each of the pins is mounted in said disc for rotational and axial movement and has a spring associated therewith for normally urging said pin in a retracted position.

4. The variable speed transmission defined in claim 2 in which the rings contain a plurality of plunger-like sections and each of the pins is hollowed out at one end thereof to form a socket to receive a plunger-like section of the ring, and a spring is provided in each of the sockets to allow a yieldable engagement of opposed pins whereby jamming is prevented as a pin is engaged with that of a complementary gear.

5. In a variable speed transmission comprising a housing, a drive shaft and a driven shaft rotatably mounted in the housing in spaced parallel relationship, in combination, gear means for transferring rotational power from the drive shaft to the driven shaft comprising a drive gear mounted on and rotatable with the drive shaft including a foraminous disc having holes formed on the circumferences of a series of concentric circles disposed in central alignment with the axis of said drive shaft, a driven gear mounted on and rotatable with the driven shaft including a foraminous disc having holes formed on the circumferences of a series of concentric circles disposed in central alignment with the axis of said driven shaft, said drive gear and said driven gear being disposed in substantially parallel planes in face to face overlapping arrangement and having the concentric circles defined by the holes of one gear being laterally spaced from an external tangential position to the concentric circle of the other gear, a plurality of engagement assemblies carried on the drive gear and the driven gear in the concentric circles thereof, each of said engagement assemblies containing a group of cylindrical pins adapted to fit into the holes disposed in a circle and a ring carried on said group of pins in position to move the pins axially through the disc, cam means for moving a selected engagement assembly on the drive gear and a corresponding engagement assembly on the driven gear into driving engagement, and control means for said cam means whereby the proper driving relation may be achieved and the meshing of incompatible engagement assemblies is positively prevented.

6. In a variable speed transmission comprising a housing, a drive shaft and a driven shaft rotatably mounted in the housing in spaced parallel relationship, in combination, gear means for transferring rotational power from the drive shaft to the driven shaft comprising a drive gear mounted on and rotatable with the drive shaft including a foraminous disc having holes formed on the circumferences of a series of concentric circles disposed in central alignment with the axis of said drive shaft, a driven gear mounted on and rotatable with the driven shaft including a foraminous disc having holes formed on the circumferences of a series of concentric circles disposed in central alignment with the axis of said driven shaft, said drive gear and said driven gear being disposed in substantially parallel planes in face to face overlapping arrangement and having the concentric circles defined by the holes of one gear being laterally spaced from an external tangential position to the concentric circles of the other gear, a plurality of engagement assemblies carried on the drive gear and the driven gear in the concentric circles thereof, each of said engagement assemblies containing a group of cylindrical pins adapted to fit into the holes disposed in a circle and a ring carried on said group of pins in position to move the pins axially through the disc, a ring follower associated with each of said engagement assemblies mounted for axial movement in said housing and having a low friction facing for contacting the ring of the engagement assembly and allowing the ring to rotate therepast, cam means for moving a selected engagement assembly on the drive gear and a corresponding engagement assembly on the driven gear into driving engagement, and control means for said cam means whereby the proper driving relation may be achieved and the meshing of incompatible engagement assemblies is positively prevented.

7. The variable speed transmission defined in claim 6, in which the control means is programmed to provide stepwise changes in gear ratios so as to provide progressive ratios through the closest increments of change in an upward or downward gearing fashion.

8. The variable speed transmission defined in claim 6, in which a reverse gear is provided in position to engage said drive gear whereby a multiple number of reverse speeds are obtained.

9. In a variable speed transmission comprising a housing, a drive shaft and a driven shaft rotatably mounted in the housing in spaced parallel relationship, in combination, gear means for transferring rotational power from the drive shaft to the driven shaft comprising a drive gear mounted on and rotatable with the drive shaft including a foraminous disc having holes formed on the circumferences of a series of concentric circles disposed in central alignment with the axis of said drive shaft, a driven gear mounted on and rotatable with the driven shaft including a foraminous disc having holes formed on the circumferences of a series of concentric circles disposed in central alignment with the axis of said driven shaft, said drive gear and said driven gear being disposed in substantially parallel planes in face to face overlapping arrangement and having the concentric circles defined by the holes of one gear being laterally spaced from an external tangential position to the concentric circle of the other gear, a plurality of engagement assemblies carried on the drive gear and the driven gear in the concentric circles thereof, each of said engagement assemblies containing a group of cylindrical pins adapted to fit into the holes disposed in a circle and a ring carried on said group of pins in position to move the pins axially through the disc, each of said rings having a plurality of plunger-like sections, each of said pins having spring means associated therewith for normally urging said pin in a retracted position and having a socket adapted to receive a plunger-like section of the ring, a spring located in the socket of the pin having a greater stiffness than said spring means whereby said spring normally retains its shape when said spring means is compressed, a ring follower associated with each of said engagement assemblies mounted for axial movement in said housing and having a low friction facing for contacting the ring of the engagement assembly and allowing the ring to rotate therepast, cam means for moving a selected engagement assembly on the drive gear and a corresponding engagement assembly on the driven gear into driving engagement, and control means for said cam means whereby the proper driving relation may be achieved and the meshing of incompatible engagement assemblies is positively prevented.

10. In a variable speed transmission comprising a housing, a drive shaft and a driven shaft rotatably mounted in the housing in spaced parallel relationship, in combination, gear means for transferring rotational power from the drive shaft to the driven shaft comprising a plurality of drive gears mounted on and rotatable with said drive shaft, a plurality of driven gears mounted on and rotatable with said driven shaft, a plurality of engagement assemblies carried on the faces of said drive gears, a plurality of engagement assemblies carried on the faces of said driven gears, said drive gears and said driven gears being grouped in pairs of gears with each pair of gears including a drive gear and a driven gear in substantially parallel planes in face to face overlapping arrangement whereby an engagement assembly of a drive gear may be engaged with an engagement assembly of a driven gear, and means for moving one and only one of the engagement assemblies of one of said drive gears and the corresponding engagement assembly of one of said driven gears into meshing position whereby driving engagement between the drive shaft and the driven shaft is effected.

11. In a variable speed transmission comprising a housing, a drive shaft and a driven shaft rotatably mounted in the housing in spaced parallel relationship, in combination, gear means for transferring rotational power from the drive shaft to the driven shaft comprising a plurality of drive gears mounted on and rotatable with said drive shaft, each of said drive gears including a foraminous disc having holes formed on the circumferences of a series of concentric circles disposed in central alignment with the axis of said drive shaft, a plurality of driven gears mounted on and rotatable with said driven shaft, each of said driven gears including a foraminous disc having holes formed on the circumferences of a series of concentric circles disposed in central alignment with the axis of said driven shaft, a plurality of engagement assemblies carried on the drive gears and the driven gears in the concentric circles thereof, each of said engagement assemblies containing a group of cylindrical pins adapted to fit into the holes disposed in a circle and a ring carried on said group of pins in position to move the pins axially through the disc, said drive gears and said driven gears being grouped in pairs of gears with each pair of gears including a drive gear and a driven gear in substantially parallel planes in face to face overlapping arrangement whereby an engagement assembly of a drive gear may be engaged with an engagement assembly of a driven gear, and means for moving one and only one of the engagement assemblies of one of said drive gears and the corresponding engagement assembly of one of said driven gears into meshing position whereby driving engagement between the drive shaft and the driven shaft is effected.

12. In a variable speed transmission comprising a housing, a drive shaft and a driven shaft rotatably mounted in the housing in spaced parallel relationship, in combination, gear means for transferring rotational power from the drive shaft to the driven shaft comprising a plurality of drive gears mounted on and rotatable with said drive shaft, each of said drive gears including a foraminous disc having holes formed on the circumferences of a series of concentric circles disposed in central alignment with the axis of said drive shaft, a plurality of driven gears mounted on and rotatable with said driven shaft, each of said driven gears including a foraminous disc having holes formed on the circumferences of a series of concentric circles disposed in central alignment with the axis of said driven shaft, a plurality of engagement assemblies carried on the drive gears and the driven gears in the concentric circles thereof, each of said engagement assemblies containing a group of cylindrical pins adapted to fit into the holes disposed in a circle and a ring carried on said group of pins in position to move the pins axially through the disc, said drive gears and said driven gears being grouped in pairs of gears with each pair of gears including a drive gear and a driven gear in substantially parallel planes in face to face overlapping arrangement whereby an engagement assembly of a drive gear may be engaged with an engagement assembly of a driven gear, cam means for moving a selected engagement assembly on a drive gear and the corresponding engagement assembly on the paired driven gear into driving engagement, and control means for said cam means to engage one and only one matched pair of engagement assemblies.

13. In a variable speed transmission comprising a housing, a drive shaft and a driven shaft rotatably mounted in the housing in spaced parallel relationship, in combination, gear means for transferring rotational power from the drive shaft to the driven shaft comprising a plurality of drive gears mounted on and rotatable with said drive shaft, each of said drive gears including a foraminous disc having holes formed on the circumferences of a series of concentric circles disposed in central alignment with the axis of said drive shaft, a plurality of driven gears mounted on and rotatable with said driven shaft, each of said driven gears including a foraminous disc having holes formed on the circumferences of a series of concentric circles disposed in central alignment with the axis of said driven shaft, a plurality of engagement assemblies carried on the drive gears and the driven gears in the concentric circles thereof, each of said engagement assemblies containing a group of cylindrical pins adapted to fit into the holes disposed in a circle and a ring carried on said group of pins in position to move the pins axially through the disc, said drive gears and said driven gears being grouped in pairs, each pair including a drive gear and a driven gear in substantially parallel planes in face to face overlapping arrangement whereby an engagement assembly of a drive gear may be engaged with an engagement assembly of a driven gear, a ring follower associated with each of said engagement assemblies mounted for axial movement in said housing and having a low friction facing for contacting the ring of the engagement assembly and allowing the ring to rotate therepast, cam means for moving a selected engagement assembly on a drive gear and the corresponding engagement assembly on the paired driven gear into driving engagement, and control means for said cam means to engage one and only one matched pair of engagement assemblies.

14. The variable speed transmission defined in claim 13, in which the control means is programmed to provide step-wise changes in gear ratios so as to provide progressive ratios through the closest increments of change in an upward or downward gearing fashion.

15. The variable speed transmission defined in claim 13, in which a reverse gear is provided in position to engage said drive gear whereby a multiple number of reverse speeds are obtained.

16. In a variable speed transmission comprising a housing, a drive shaft and a driven shaft rotatably mounted in the housing in spaced parallel relationship, in combination, gear means for transferring rotational power from the drive shaft to the driven shaft comprising a plurality of drive gears mounted on and rotatable with said drive shaft, each of said drive gears including a foraminous disc having holes formed on the circumferences of a series of concentric circles disposed in central alignment with the axis of said drive shaft, a plurality of driven gears mounted on and rotatable with said driven shaft, each of said driven gears including a foraminous disc having holes formed on the circumferences of a series of concentric circles disposed in central alignment with the axis of said driven shaft, a plurality of engagement assemblies carried on the drive gear and the driven gear in the concentric circles thereof, each of said engagement assemblies containing a group of cylindrical pins adapted to fit into the holes disposed in a circle and a ring carried on said group of pins in position to move the pins axially through the disc, each of said rings having a plurality of plunger-like sections, each of said pins having spring means associated therewith for normally urging said pin in a retracted position and having a socket adapted to receive a plunger-like section of the ring, a spring located in the socket of the pin having a greater stiffness than said spring means whereby said spring normally retains its shape when said spring means is compressed, said drive gears and said driven gears being grouped in pairs of gears with each pair of gears including a drive gear and a driven gear in substantially parallel planes in face to face overlapping arrangement whereby an engagement assembly of a drive gear may be engaged with an engagement assembly of a driven gear, cam means for moving a selected engagement assembly on a drive gear and the corresponding engagement assembly on the paired driven gear into driving engagement, and control means for said cam means to engage one and only one matched pair of engagement assemblies.

17. In a variable speed transmission comprising a housing, a drive shaft and a driven shaft rotatably mounted in the housing in spaced parallel relationship, in combination, gear means for transferring rotational power from the drive shaft to the driven shaft comprising an intermediate shaft rotatably mounted in the housing in spaced parallel relation to said drive shaft and said driven shaft, a drive gear mounted on and rotatable with said drive shaft, a driven gear mounted on and rotatable with said driven shaft, both an intermediate driven gear and an intermediate drive gear mounted on and rotatable with said intermediate shaft with the intermediate driven gear positioned to operatively engage with the drive gear and the intermediate drive gear positioned to operatively engage with the driven gear, said drive gear, driven gear, intermediate drive gear and intermediate driven gear each being in the form of a foraminous disc having holes formed on the circumferences of a series of concentric circles and having an engagement assembly in each of said circles of holes, each of said engagement assemblies containing a group of cylindrical pins adapted to fit into the holes disposed in a circle and a ring carried on said group of pins in position to move the pins axially through the disc, and means for moving said rings axially with respect to the gears in synchronized fashion for synchronized engagement of selected engagement assemblies whereby said assemblies mesh to complete driving engagement between the drive shaft and the driven shaft.

18. In a variable speed transmission comprising a housing, a drive shaft and a driven shaft rotatably mounted in the housing in spaced parallel relationship, in combination, gear means for transferring rotational power from the drive shaft to the driven shaft comprising an intermediate shaft rotatably mounted in the housing in spaced parallel relation to said drive shaft and said driven shaft, a drive gear mounted on and rotatable with said drive shaft, a driven gear mounted on and rotatable with said driven shaft, both an intermediate driven gear and an intermediate drive gear mounted on and rotatable with said intermediate shaft with the intermediate driven gear positioned to operatively engage with the drive gear and the intermediate drive gear positioned to operatively engage with the driven gear, said drive gear, driven gear, intermediate drive gear and intermediate driven gear each being in the form of a foraminous disc having holes formed on the circumferences of a series of concentric circles and having an engagement assembly in each of said circles of holes, each of said engagement assemblies containing a group of cylindrical pins adapted to fit into the holes disposed in a circle and a ring carried on said group of pins in position to more the pins axially through the disc, each of said rings having a plurality of plunger-like sections, each of said pins having spring means associated therewith for normally urging said pin in a retracted position and having a socket adapted to receive a plunger-like section of the ring, a spring located in the socket of the pin having a greater stiffness than said spring means whereby said spring normally retains its shape when said spring means is compressed, a ring follower associated with each of said engagement assemblies mounted for axial movement in said housing and having a low friction facing for contacting the ring of the engagement assembly and allowing the ring to rotate therepast, cam means for moving selected ring followers to cause the meshing of a selected engagement assembly of each drive gear with a corresponding engagement assembly of a driver gear whereby said assemblies mesh to complete driving engagement between the drive shaft and the driven shaft.

19. In a variable speed transmission comprising a housing, a drive shaft and a driven shaft rotatably mounted in the housing in spaced parallel relationship, in combination, gear means for transferring rotational power from the drive shaft to the driven shaft comprising a plurality of intermediate shafts each mounted for rotation in the housing in spaced parallel relation to said drive shaft and said driven shaft, a drive gear mounted on and rotatable with said drive shaft, a driven gear mounted on and rotatable with said driven shaft, each of said intermediate shafts containing both a drive gear and a driven gear with the drive gear of one shaft being paired with the driven gear of another shaft whereby a driving relation is obtained from the drive shaft to the driven shaft through the intermediate shafts, said drive gears and said driven gears each being in the form of a foraminous disc having holes formed on the circumferences of a series of concentric circles and having an engagement assembly in each of said circles of holes, each of said engagement assemblies containing a group of cylindrical pins adapted to fit into the holes disposed in a circle and a ring carried on said group of pins in position to move the pins axially through the disc, and means for moving said rings axially with respect to the gears in synchronized fashion for synchronized engagement of selected engagement assemblies whereby said assemblies mesh to complete driving engagement between the drive shaft and the driven shaft.

References Cited by the Examiner

UNITED STATES PATENTS

| | | | |
|---|---|---|---|
| 898,870 | 9/1908 | Gilroy | 74—415 |
| 901,980 | 10/1908 | Mayo et al. | 74—351 |

DAVID J. WILLIAMOWSKY, *Primary Examiner.*

H. S. LAYTON, *Assistant Examiner.*